(12) United States Patent
Chung et al.

(10) Patent No.: US 12,248,341 B2
(45) Date of Patent: Mar. 11, 2025

(54) DISPLAY DEVICE

(71) Applicant: Samsung Display Co., Ltd., Yongin-Si (KR)

(72) Inventors: Seunghwan Chung, Seongnam-si (KR); Hung Kun Ahn, Seongnam-si (KR); Seokwon Jang, Seoul (KR); Jungkyu Jo, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 80 days.

(21) Appl. No.: 17/370,381

(22) Filed: Jul. 8, 2021

(65) Prior Publication Data

US 2022/0137678 A1    May 5, 2022

(30) Foreign Application Priority Data

Nov. 3, 2020    (KR) .................... 10-2020-0145374

(51) Int. Cl.
  *G02F 1/13363*    (2006.01)
  *G02B 5/30*    (2006.01)
  (Continued)

(52) U.S. Cl.
  CPC ......... *G06F 1/1686* (2013.01); *G02B 5/3041* (2013.01); *G02F 1/133638* (2021.01); *G06F 1/1637* (2013.01); *G02F 1/133528* (2013.01); *G02F 1/133531* (2021.01); *G02F 1/133541* (2021.01); *G06F 2200/1634* (2013.01)

(58) Field of Classification Search
  CPC .......... G02F 1/13363; G02F 1/133638; G02F 1/133634; G02F 1/133528; G02F 1/133531; G02F 1/133541; G02F 2413/03; G02F 2413/04; G02F 2413/07; G02F 2413/08
  See application file for complete search history.

(56) References Cited

U.S. PATENT DOCUMENTS

| 9,753,200 B2 | 9/2017 | Lee et al. |
| 10,345,941 B2 | 7/2019 | Nakai et al. |

(Continued)

FOREIGN PATENT DOCUMENTS

| JP | 6279374 B2 | 2/2018 |
| JP | 6483811 B2 | 3/2019 |

(Continued)

OTHER PUBLICATIONS

Daisuke Kobayashi et al., "Novel High Retardation Polymer Film and Its Applications," 15th Microoptics Conference (MOC'09), Oct. 25-28, 2009, 2 pages, Japan.

*Primary Examiner* — Angela M. Medich
(74) *Attorney, Agent, or Firm* — CANTOR COLBURN LLP

(57) ABSTRACT

A display device includes a display panel, a polarizing plate disposed above the display panel, a support member disposed below the display panel, where a through hole is defined in the support member, an electronic module disposed below the display panel, where the electronic module overlaps the through hole, and a protective layer disposed above the polarizing plate. The protective layer has a thickness direction retardation of greater than about 0 nm and not greater than about 1,500 nm and an in-plane retardation of greater than about 0 nm and not greater than about 200 nm.

21 Claims, 7 Drawing Sheets

(51) Int. Cl.
  *G02F 1/1335*   (2006.01)
  *G06F 1/16*    (2006.01)

(56) References Cited

U.S. PATENT DOCUMENTS

| | | | |
|---|---|---|---|
| 10,466,399 B2 | 11/2019 | Lee | |
| 10,481,423 B2 | 11/2019 | Song et al. | |
| 10,777,623 B2 | 9/2020 | Rhee et al. | |
| 2016/0291228 A1* | 10/2016 | Lee | G02B 5/3016 |
| 2019/0212788 A1* | 7/2019 | Kwak | G06F 1/1637 |
| 2021/0302638 A1* | 9/2021 | Yoon | G02F 1/13363 |
| 2021/0405458 A1* | 12/2021 | Zhong | G02F 1/133531 |

FOREIGN PATENT DOCUMENTS

| | | |
|---|---|---|
| KR | 1020160118436 A | 10/2016 |
| KR | 1020170079644 A | 7/2017 |
| KR | 1020170083685 A | 7/2017 |
| KR | 1020180062249 A | 6/2018 |
| KR | 1020180126883 A | 11/2018 |
| KR | 1020190084397 A | 7/2019 |

\* cited by examiner

DISPLAY DEVICE

This application claims priority to Korean Patent Application No. 10-2020-0145374, filed on Nov. 3, 2020, and all the benefits accruing therefrom under 35 U.S.C. § 119, the content of which in its entirety is herein incorporated by reference.

BACKGROUND

1. Field

The disclosure herein relates to a display device, and more particularly, to a display device including a camera module.

2. Description of the Related Art

Various types of display device are used to provide image information, and a display device may include an electronic module for receiving external signals or providing output signals to an outside, e.g., a camera module. Recently, demand for a display device capable of obtaining high resolution photograph images has increased.

SUMMARY

In a display device including a camera module, the camera module may be disposed in a display area for displaying images to increase the size of the display area, and accordingly, the quality of photograph images received through the display area may be desired to be enhanced.

The disclosure provides a display device for enhancing photographing quality of images captured using a camera module in a display surface direction of the display device.

An embodiment of the invention provides a display device including a display panel, a polarizing plate disposed above the display panel, a support member disposed below the display panel, where a through hole is defined in the support member, an electronic module disposed below the display panel, where the electronic module overlaps the through hole, and at least one protective layer disposed above the polarizing plate, where the protective layer has a thickness direction retardation of greater than about 0 nanometer (nm) and not greater than about 1,500 nm. In an embodiment, the at least one protective layer may have an in-plane retardation perpendicular to the thickness direction of greater than about 0 nm and not greater than about 200 nm.

In an embodiment, the at least one protective layer may have a thickness in a range of about 10 micrometers (µm) to about 200 µm.

In an embodiment, the at least one protective layer may have a transmittance of about 85% or greater for light in a wavelength band of about 400 nm to about 800 nm.

In an embodiment, the at least one protective layer may include at least one selected from polyimide, polycarbonate, cycloolefin polymer, triacetyl cellulose, polyethylene terephthalate, and polymethyl methacrylate.

In an embodiment, the protective layer may include a first protective layer adjacent to the polarizing plate and a second protective layer disposed on the first protective layer, where the first protective layer may include glass or a polymer resin, and the second protective layer may include a polymer resin.

In an embodiment, a thickness direction retardation of the first protective layer and a thickness direction retardation of the second protective layer may be different from each other.

In an embodiment, the first protective layer may include glass, and the second protective layer may include a polymer resin.

In an embodiment, the protective layer may further include a third protective layer disposed between the polarizing plate and the first protective layer, where the third protective layer may include a conductive material.

In an embodiment, the electronic module may be at least partially inserted into the through hole.

In an embodiment, the display device may further include an adhesive layer disposed between the polarizing plate and at least one the protective layer.

In an embodiment, the display panel may include an active area and a peripheral area adjacent to the active area, and the through hole may overlap the active area and may be defined to be spaced apart from the peripheral area on a plane.

In an embodiment of the invention, a display device includes an electronic module, a display panel disposed above the electronic module and including a first display area and a second display area adjacent to the first display area, where the electronic module overlaps the second display area, a polarizing plate disposed above the display panel, where the polarizing plate includes a linear polarization layer and at least one phase retardation layer, and at least one protective layer disposed above the polarizing plate, where the protective layer has a thickness direction retardation of greater than about 0 nm and not greater than about 1,500 nm and an in-plane retardation perpendicular to the thickness direction of greater than about 0 nm and not greater than about 200 nm.

In an embodiment, the second display area may have a lower pixel density or a lower wiring density than the first display area.

In an embodiment, the protective layer may include a first protective layer adjacent to the polarizing plate and a second protective layer disposed on the first protective layer, where the first protective layer may include glass or a polymer resin, and the second protective layer may include a polymer resin.

In an embodiment, a thickness direction retardation of the first protective layer and a thickness direction retardation of the second protective layer may be different from each other.

In an embodiment, the at least one protective layer may have a thickness in a range of about 10 µm to about 200 µm.

In an embodiment, an angle formed between a transmission axis of the linear polarization layer and a first optical axis of the protective layer may be about 45±5°.

In an embodiment, the at least one phase retardation layer may include a λ/2 phase retardation layer and a λ/4 phase retardation layer, and the linear polarization layer may be closer to the λ/2 phase retardation layer than the λ/4 phase retardation layer.

In an embodiment, an angle between a transmission axis of the linear polarization layer and a second optical axis of the λ/2 phase retardation layer may be about 15±5°, and an angle between a transmission axis of the linear polarization layer and a third optical axis of the λ/4 phase retardation layer may be about 75±5°.

In an embodiment, the polarizing plate may further include a base film disposed above the linear polarization layer, and an angle between a transmission axis of the linear polarization layer and a fourth optical axis of the base film may be about 45±5°.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
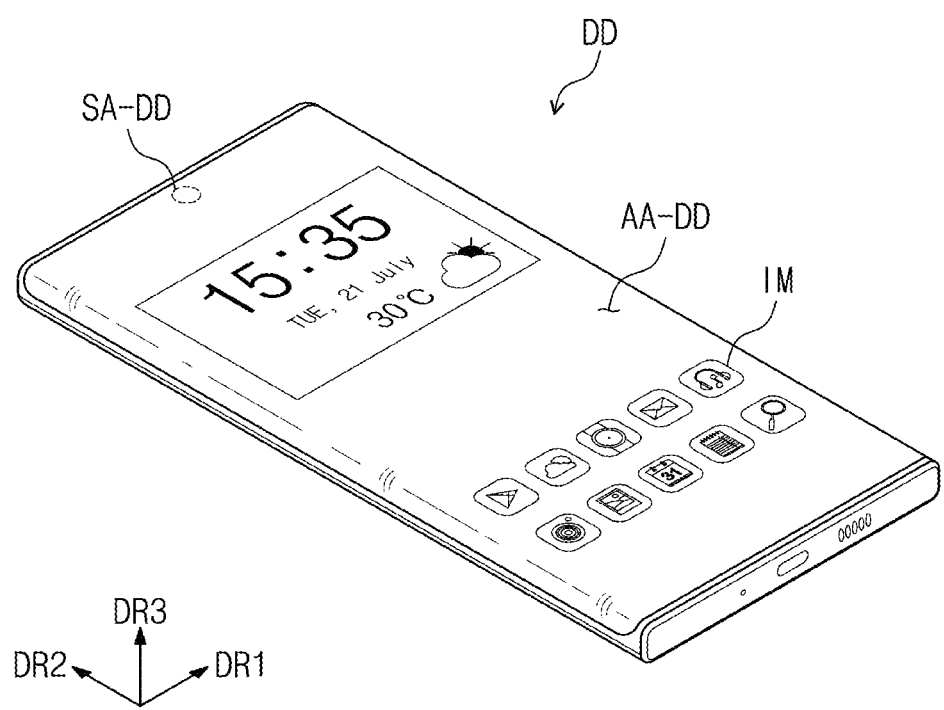
FIG. 1 is a perspective view of a display device of an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element (or a region, a layer, a portion, etc.) is referred to as being "on," "connected to," or "coupled to" another element, the element can be directly disposed on/connected to/coupled to the other element, or an intervening element may be present therebetween. In contrast, when an element is referred to as being "directly on," "connected directly to," or "coupled directly to" another element, there are no intervening elements present. Like reference numerals refer to like elements. Also, in the drawings, the thickness, the ratio, and the dimensions of elements are exaggerated for an effective description of technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the invention. The terms of a singular form may include plural forms unless the context clearly indicates otherwise. Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which the invention pertains. It is also to be understood that terms defined in commonly used dictionaries should be interpreted as having meanings consistent with the meanings in the context of the related art, and are expressly defined herein unless they are interpreted in an ideal or overly formal sense.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a display device according to the invention will be described in detail with reference to the accompanying drawings.

Figure 2:
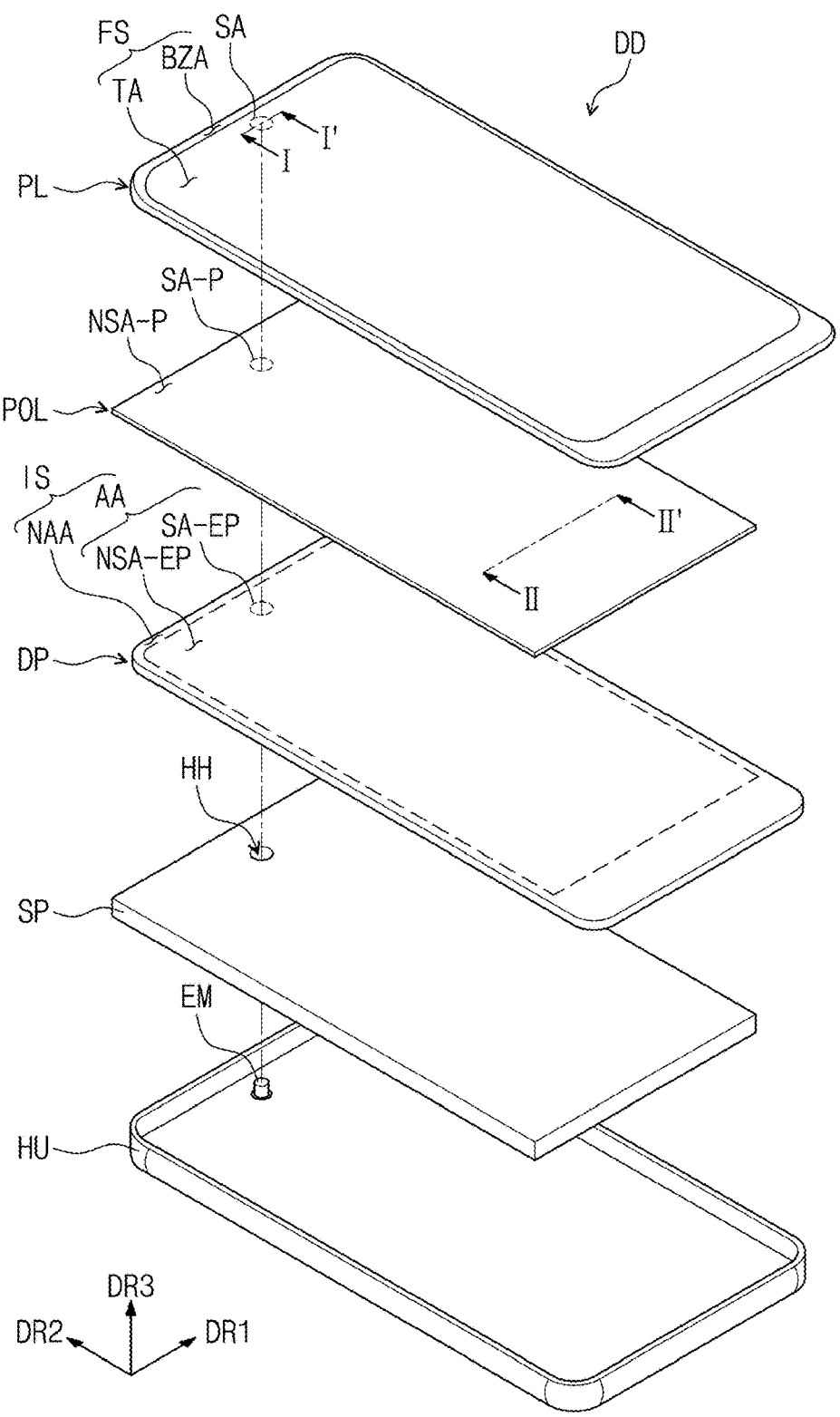
FIG. 2 is an exploded perspective view of a display device according to an embodiment.
Figure 3:
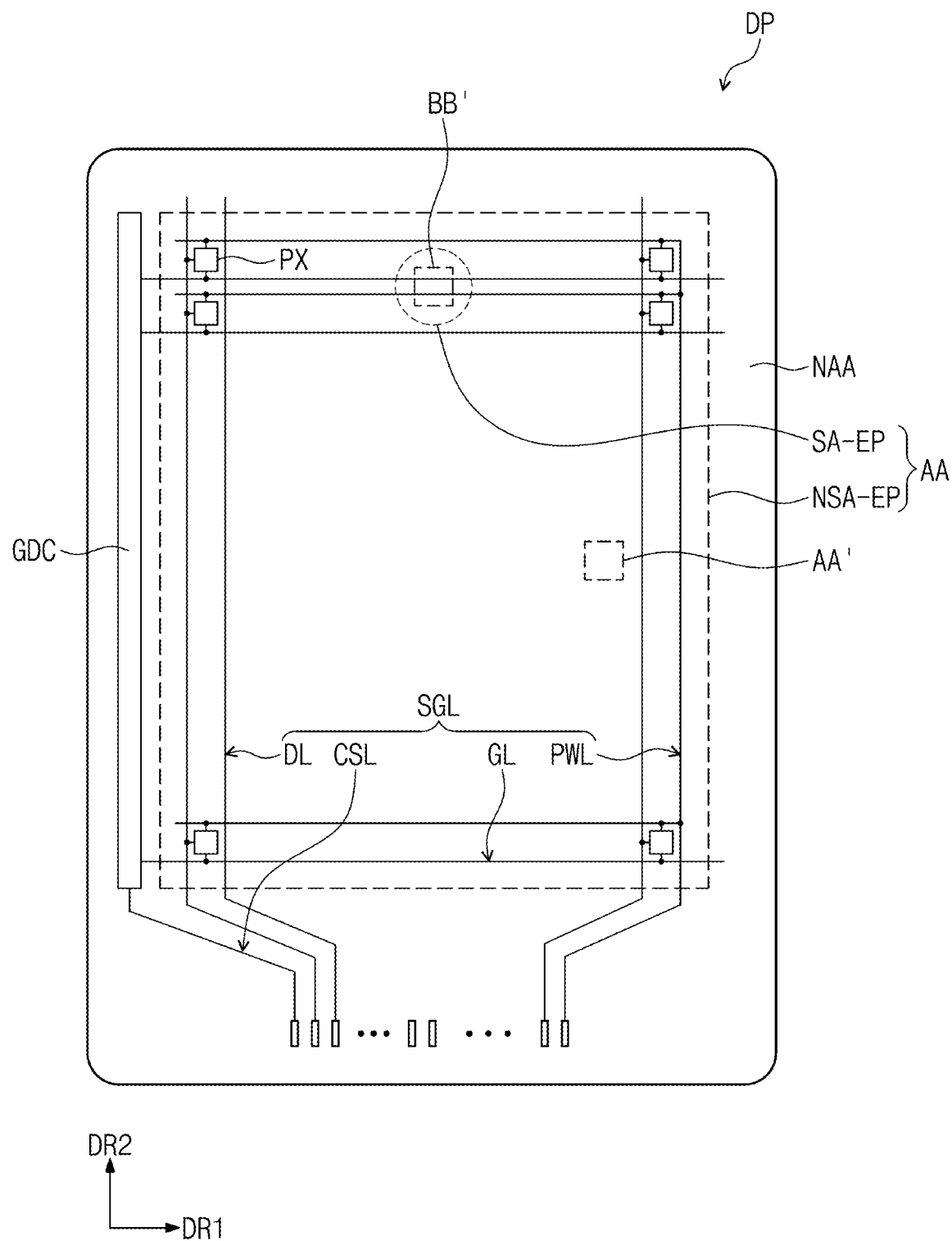
FIG. 3 is a plan view of a display device according to an embodiment.
Figure 4:
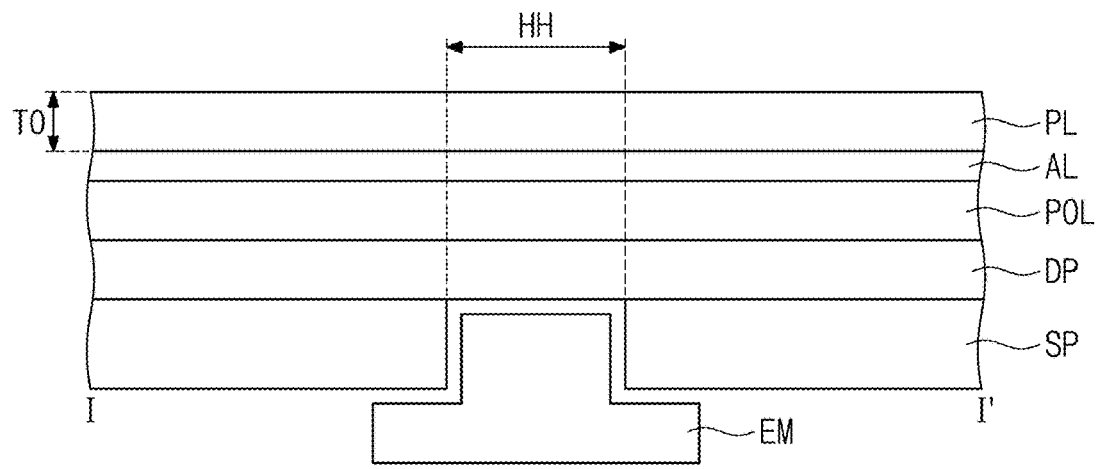
FIG. 4 is a cross-sectional view of a portion of a display device according to an embodiment.
Figure 5:
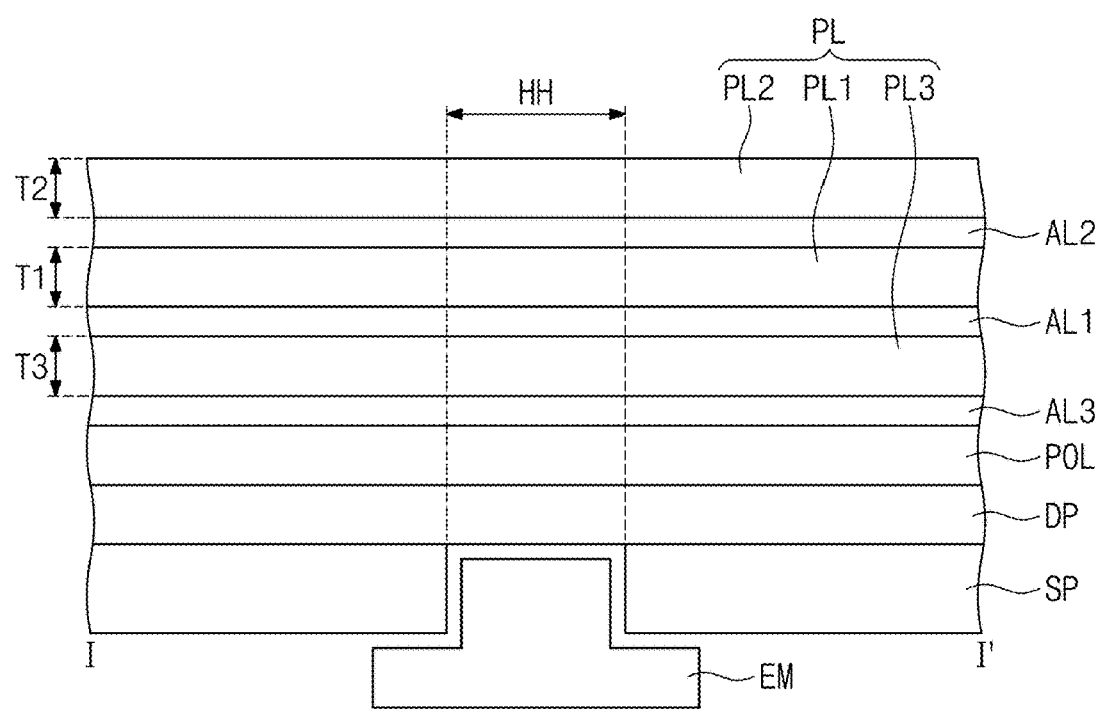
FIG. 5 is a cross-sectional view of a portion of a display device according to an embodiment.

FIG. 1 is a perspective view of a display device of an embodiment. FIG. 2 is an exploded perspective view of a display device according to an embodiment. FIG. 3 is a plan view of a display panel according to an embodiment. FIG. 4 is a cross-sectional view showing a portion corresponding to line I-I' of FIG. 2. FIG. 5 is a cross-sectional view of a display device illustrating another embodiment of the invention.

An embodiment of a display device DD may be a device activated based on electrical signals. In one embodiment, for example, the display device DD may be a mobile phone, a tablet computer, a car navigation system, a game console, or a wearable device, but is not limited thereto. In FIG. 1, an embodiment where the display device DD is a mobile phone is shown.

The display device DD may display an image IM through an active area AA-DD. The active area AA-DD may include a plane defined by a first directional axis DR1 and a second directional axis DR2. The active area AA-DD may further include a curved surface bent from one side of the plane defined by the first directional axis DR1 and the second directional axis DR2. In an embodiment, as shown in FIG. 1, the display device DD may include two curved surfaces each bent from both sides of the plane defined by the first directional axis DR1 and the second directional axis DR2. However, the shape of the active area AA-DD is not limited thereto. In one alternative embodiment, for example, the active area AA-DD may include only a plane. Alternatively, the active area AA-DD may further include four curved surfaces each bent from four sides of the plane.

In an embodiment, the display device DD may be flexible. Herein, "flexible" indicates a property of being bendable, and may include all from a structure being completely foldable to a structure being bendable to a few nanometers. In one embodiment, for example, the display device DD may be a foldable display device. In an alternative embodiment, the display device DD may be rigid.

It would be understood that the first to third directional axes DR1 to DR3, and directions indicated by the first to third directional axes DR1, DR2, and DR3 show in the accompanying drawings and described herein are relative concepts, and may thus be changed to other directions. In addition, the directions indicated by the first to third directional axes DR1, DR2, and DR3 may be referred to as first to third directions, and the same reference numerals may be used. Herein, the first directional axis DR1 and the second directional axis DR2 may be perpendicular to each other, and the third directional axis DR3 may be perpendicular to the plane defined by the first directional axis DR1 and the second directional axis DR2.

A sensing area SA-DD may be defined in the active area AA-DD of the display device DD. In an embodiment, as shown in FIG. 1, a single sensing area SA-DD may be defined in the active area AA-DD of the display device DD, but the number of sensing areas SA-DD is not limited thereto. The sensing area SA-DD may be defined by a portion of the active area AA-DD. The display device DD may display images through the sensing area SA-DD.

An electronic module EM may be disposed in an area overlapping the sensing area SA-DD. The electronic module EM may receive external inputs transmitted through the sensing area SA-DD or provide outputs through the sensing area SA-DD.

In an embodiment, as shown in FIG. 2, the display device DD may include a display panel DP, a polarizing plate POL disposed above the display panel DP, a support member SP disposed below the display panel DP, an electronic module EM disposed below the display panel DP, and a protective layer PL disposed on the polarizing plate POL. In an embodiment, a through hole HH is defined in the support member SP, and the electronic module EM may be disposed to overlap or corresponding to the through hole HH. According to an embodiment, the protective layer PL may have a thickness direction retardation of greater than about 0 nanometer (nm) and not greater than about 1,500 nm. The protective layer PL may have an in-plane retardation of greater than about 0 nm and not greater than about 200 nm. The protective layer PL will be described later in greater detail.

In an embodiment, as shown in FIGS. 2 and 4, the display device DD may include an electronic module EM, a support member SP, a display panel DP, a polarizing plate POL, and a protective layer PL which are sequentially stacked one on another. In an embodiment, as shown in FIGS. 2 and 3, the display panel DP may include a first display area NSA-EP and a second display area SA-EP adjacent to the first display area NSA-EP. The second display area SA-EP may overlap the electronic module EM.

In an embodiment, as shown in FIG. 2, the display device DD may include a housing HU disposed below the display panel DP. The electronic module EM, the display panel DP, etc. may be accommodated in the housing HU. When the display panel DP is accommodated in the housing HU, the peripheral area NAA of the display panel DP may be partially bent to be disposed therein.

In an embodiment of the display device DD, the electronic module EM may be an electronic component for outputting or receiving optical signals. In one embodiment, for example, the electronic module EM may be a camera module configured to photograph external images. In an embodiment, the electronic module EM may be a sensor module such as a proximity sensor or an infrared light emitting sensor.

At least a portion of the electronic module EM may be inserted into the through hole HH of the support member SP. The support member SP may include a cushion layer and a metal support layer. The through hole HH may be defined through the cushion layer and the metal support layer. The cushion layer may protect the electronic module EM and the display panel DP from an external impact or physical shocks applied from the outside the display device DD. The metal support layer may be a support substrate for supporting members included in the display device DD such as the display panel DP. The metal support layer may serve a function such as heat dissipation or electromagnetic wave shielding.

The display panel DP may be disposed above the electronic module EM. The display panel DP may include an active area AA for displaying the image IM and a peripheral area NAA adjacent to the active area AA. In an embodiment, a front surface IS of the display panel DP may include the active area AA and the peripheral area NAA. The active area AA may be an area activated based on electrical signals.

The peripheral area NAA may be adjacent to the active area AA. The peripheral area NAA may surround the active area AA. A driving circuit or driving wiring for driving the active area AA, various signal lines or pads for providing electrical signals to the active area AA, or electronic elements may be disposed in the peripheral area NAA.

In an embodiment, the through hole HH may overlap the active area AA of the display panel DP. In an embodiment, the through hole HH may be defined to be spaced apart from the peripheral area NAA of the display panel DP on a plane parallel to the plane defined by the first and second directional axes DR1 and DR2.

The display panel DP may include a first display area NSA-EP and a second display area SA-EP. The second display area SA-EP may be an area overlapping the electronic module EM. The first display area NSA-EP may be an area disposed to surround at least a portion of the second display area SA-EP. The second display area SA-EP may correspond to the sensing area SA-DD of the display device DD. The first display area NSA-EP may be a portion corresponding to the active area AA-DD except for the sensing area SA-DD in the display device.

In a plan view in the third directional axis DR3, the second display area SA-EP may be smaller in size than the first display area NSA-EP. The first display area NSA-EP may have a different transmittance from the second display area SA-EP. In an embodiment, the second display area SA-EP may have a greater transmittance than the first display area NSA-EP.

The polarizing plate POL may be disposed above the display panel DP. The polarizing plate POL may be disposed between the display panel DP and the protective layer PL. The polarizing plate POL may perform an anti-reflection function by reducing reflection of light incident from the outside the display device DD. The polarizing plate POL may include a second area SA-P overlapping the second display area SA-EP of the display panel DP, and a first area NSA-P overlapping the first display area NSA-EP of the display panel DP. The second area SA-P of the polarizing plate POL may overlap the through hole HH of the support member SP.

The protective layer PL may be disposed above the polarizing plate POL. In an embodiment, a single protective layer PL may be disposed above the polarizing plate POL. Alternatively, the protective layer PL may be provided in plural or may have a multilayer structure. The protective layer PL includes an upper surface FS exposed to an outside. An outermost surface FS of the display device DD may be substantially defined by an upper surface FS of the protective layer PL. The upper surface FS of the display device DD may correspond to a front surface of the display device DD. The upper surface FS of the display device DD may be a display surface on which the image IM (FIG. 1) is displayed. In an embodiment, a transmission area TA in the upper surface FS of the protective layer PL may be an optically transparent area. The transmission area TA may have a shape corresponding to the active area AA of the display panel DP. In one embodiment, for example, the transmission area TA overlaps a front surface or at least a portion of the active area AA. Images displayed in the active area AA of the display panel DP may be viewed from the outside through the transmission area TA.

In an embodiment, a bezel area BZA in the upper surface FS of the protective layer PL may be adjacent to the transmission area TA. The bezel area BZA may cover a peripheral area NAA of the display panel DP to prevent the peripheral area NAA from being viewed from the outside. A sensing area SA of protective layer PL may be defined in the transmission area TA. The sensing area SA of protective layer PL may be defined as the sensing area SA-DD of the display device DD.

In an embodiment, as shown in FIG. 3, the display panel DP may include a plurality of signal lines SGL (hereinafter, signal lines), a plurality of pixels PX (hereinafter, pixels), and a driving circuit GDC. The pixels PX are disposed in the active area AA. Each of the pixels PX may include a light emitting element and a pixel driving circuit connected thereto. The second display area SA-EP may be a portion having a lower pixel density or a lower wiring density than the first display area NSA-EP.

FIG. 3 illustrates area AA' in the first display area NSA-EP, and area BB' in the second display area SA-EP. The area AA' and the area BB' are the same in size, and the area BB' may have a lower pixel density than the area AA'. In an embodiment of the display panel DP, the second display area SA-EP may have a smaller number of pixels PX per unit area than the first display area NSA-EP. An area without having the pixels PX in the second display area SA-EP corresponds to an area through which optical signals are transmitted. However, the embodiment of the invention is not limited thereto, and the second display area SA-EP may have substantially the same level of pixel density as the first display area NSA-EP.

In an embodiment where the second display area SA-EP has substantially the same pixel density as the first display area NSA-EP, the second display area SA-EP may have a lower wiring density than the first display area NSA-EP. In one embodiment, for example, circuit wiring such as a transistor for driving pixels disposed in the second display area SA-EP may move to and be disposed in the peripheral area NAA. Accordingly, in such an embodiment, the second display area SA-EP may have a relatively lower wiring density than the first display area NSA-EP.

The pixels PX are not disposed in the peripheral area NAA. The driving circuit GDC is disposed in the peripheral area NAA. The driving circuit GDC may include a scan driving circuit. The scan driving circuit generates a plurality of scan signals (hereinafter, scan signals), and sequentially outputs the scan signals to a plurality of scan lines GL. The scan driving circuit may further output another control signal to the driving circuit of the pixels PX. The scan driving circuit may include a plurality of thin film transistors formed through a same process as the driving circuit of the pixels PX, for example, a low temperature polycrystalline silicon ("LTPS") process or a low temperature polycrystalline oxide ("LTPO") process.

The signal lines SGL include scan lines GL, data lines DL, a power line PWL, and a control signal line CSL. The signal lines SGL may further include separate reset lines and light emitting control lines. The scan lines GL are respectively connected to a corresponding pixel PX among the pixels PX, and the data lines DL are respectively connected to a corresponding pixel PX among the pixels PX. The power line PWL is connected to the pixels PX. The control signal line CSL may provide control signals to the scan driving circuit. The signal lines SGL may be connected to a circuit board (not shown). The signal lines SGL may be connected to a timing control circuit in the form of an integrated chip mounted on the circuit board.

In an embodiment of the display device DD, the display panel DP may include an organic light emitting element, a quantum dot light emitting element, a micro LED light emitting element, or a nano LED light emitting element, for example, but the embodiment of the invention is not limited thereto.

In an embodiment, the display device DD may include a protective layer PL. FIG. 4 illustrates a portion of an embodiment of a display device including a single protective layer PL. FIG. 5 illustrates a portion of an embodiment of a display device including three protective layers PL1, PL2, and PL3. However, to the embodiment of the invention is not limited thereto, and alternatively, the display device may include four or more protective layers.

An embodiment of the protective layer PL may have a thickness direction retardation $R_{the}$ of greater than about 0 nm and not greater than about 1,500 nm and an in-plane retardation $R_e$ of greater than 0 nm and not greater than about 200 nm. Thickness direction retardation may be defined as in Equation 1 below, and in-plane retardation may be defined as in Equation 2 below.

Thickness direction retardation $(R_{the})=$
$\{(|n_x-n_y|/2)-n_z\} \times d$             [Equation 1]

In-plane retardation $(Re)=(|n_x-n_y|) \times d$             [Equation 2]

In Equations 1 and 2, $n_x$ denotes a refractive index in one-axis (x-axis) direction in a layer plane, $n_y$ denotes a refractive index in the other-axis (y-axis) direction perpendicular to the one-axis in the layer plane, $n_z$ denotes a refractive index in the z-axis direction, which is a thickness direction, and d denotes a layer thickness. Retardation values may represent values at a specific wavelength.

The in-plane retardation may be retardation on a plane defined by the first directional axis DR1 and the second directional axis DR2. The thickness direction retardation may be parallel to a direction of the third directional axis DR3.

In one embodiment, for example, the protective layer PL may have a thickness direction retardation of about 1,000 nm or less, and the protective layer PL may have an in-plane retardation of about 100 nm or less. However, the embodiment of the invention is not limited thereto.

The protective layer PL having retardation may have a difference in elongation between one of the one-axis (x-axis) and the other-axis (y-axis) and the other of the one-axis (x-axis) and the other-axis (y-axis). A direction having a relatively higher elongation may be defined as an optical axis (hereinafter, a first optical axis) of the protective layer PL. The first optical axis PL-A (FIG. 7) of the protective layer PL may form an angle of about 45±5° with a transmission axis PP-TA (FIG. 7) of the linear polarization layer PP which will be described later.

According to an embodiment, the protective layer PL may have a transmittance of about 85% or greater at a wavelength of about 400 nm to about 800 nm. The protective layer PL may have a thickness T0 of about 10 micrometers (μm) to about 200 μm. If the protective layer has a thickness of less than about 10 μm, impact resistance may decrease. If the protective layer has a thickness of greater than about 200 nm, a display device including the protective layer may not be effectively foldable.

The protective layer PL may include at least one selected from polyimide, polycarbonate, cycloolefin polymer, triacetyl cellulose, polyethylene terephthalate, and polymethyl methacrylate. In one embodiment, for example, the protective layer PL may include polyimide or a cycloolefin polymer. However, the embodiment of the invention is not limited thereto.

When an image of an object in front of the display device DD (hereinafter, a front view) is captured using a camera module, image quality may deteriorate due to optical interference in the polarizing plate and the protective layer. In an embodiment, capturing the front view using the camera module may correspond to taking a picture in a selfie mode. When an object to be photographed and the camera module face each other with a front surface of the display device therebetween, chromatic dispersion or color unevenness may be caused. External light passes through the polarizing plate and the protective layer to be incident on the camera module, and the chromatic dispersion may be viewed due to the retardation between the polarizing plate and the protective layer. The chromatic dispersion may be caused due to a difference in transmittance for each wavelength according to the in-plane retardation of the protective layer. The color unevenness may be caused due to a difference in optical paths, and may be caused due to a difference in the distance between the subject to be photographed and the camera module, and may be a phenomenon in which an area far from a shooting focus is viewed as spotting. When the center of the object is brought to the shooting focus, an optical path from an edge of the subject to the camera module is different from an optical path from the center of the subject to the camera module, and accordingly, the edge of the subject may be viewed as having spotting.

In an embodiment of the invention, the display device DD optimizes the in-plane retardation and the thickness retardation of the protective layer PL disposed above the polarizing plate POL, and may thus control optical interference between the polarizing plate POL and the protective layer PL. In such an embodiment, interference of light transmitted through the protective layer PL and the polarizing plate POL from the outside and incident on the camera module may be controlled. Accordingly, in an embodiment of the display device DD, when an object is photographed using the camera module with the upper surface FS therebetween, image quality deterioration may be effectively prevented.

In an embodiment, where the protective layer PL is provided in plural or has a multilayer structure, the plurality of protective layers PL1, PL2, and PL3 may be disposed on the polarizing plate POL, as shown in FIG. 5. In such an embodiment, the display device DD may include the first protective layer PL1 and the second protective layer PL2. In addition, the display device DD may further include the third protective layer PL3. However, the embodiment of the invention is not limited thereto, and alternatively, the display device DD may include four or more protective layers.

Referring to FIG. 5, in an embodiment, the first protective layer PL1, the second protective layer PL2, and the third protective layer PL3 may be disposed above the polarizing plate POL. The first protective layer PL1 may be disposed above the polarizing plate POL, and the second protective layer PL2 may be disposed above the first protective layer PL1. The third protective layer PL3 may be disposed between the first protective layer PL1 and the polarizing plate POL. In such an embodiment, the protective layers PL1, PL2, and PL3 may be in the form in which the third protective layer PL3, the first protective layer PL1, and the second protective layer PL2 are sequentially stacked on the polarizing plate POL. The second protective layer PL2 may be spaced apart from the polarizing plate POL with the first protective layer PL1 therebetween. In such an embodiment, each of the first protective layer PL1, the second protective layer PL2 and the third protective layer PL3 may have substantially same characteristics as the protective layer PL described. In an alternative embodiment, the third protective layer PL3 may be omitted. In an embodiment, the third protective layer PL3 may be disposed on the second protective layer PL2. In such an embodiment where the third protective layer PL3 is disposed on the second protective layer PL2, another protective layer may be further disposed on the third protective layer PL3.

In an embodiment, the first protective layer PL1, the second protective layer PL2, and the third protective layer PL3 may each have a transmittance of about 85% or greater in a wavelength of about 400 nm to about 800 nm. The first protective layer PL1, the second protective layer PL2, and the third protective layer PL3 may each be optically transparent. The first protective layer PL1 may include glass or a polymer resin. The second protective layer PL2 may include a polymer resin. In one embodiment, for example, the first protective layer PL1 may include glass, and the second protective layer PL2 may include a polymer resin. The second protective layer PL2 may include at least one selected from polyimide, polycarbonate, cycloolefin polymer, triacetyl cellulose, polyethylene terephthalate, and polymethyl methacrylate. In an embodiment, where the first protective layer PL1 includes glass, the second protective layer PL2 may function to prevent scattering.

Alternately, both the first protective layer PL1 and the second protective layer PL2 may include a polymer resin. In an embodiment, where the first protective layer PL1 includes a polymer resin, the first protective layer PL1 may include at least one selected from polyimide, polycarbonate, cycloolefin polymer, triacetyl cellulose, polyethylene terephthalate, and polymethyl methacrylate. The polymer resin included in the first protective layer PL1 and the polymer resin included in the second protective layer PL2 may be different from each other. However, the embodiment of the invention is not limited thereto, and alternatively, the polymer resin included in the first protective layer PL1 and the polymer resin included in the second protective layer PL2 may be the same as each other.

In an embodiment, the third protective layer PL3 may include a conductive material. The third protective layer PL3 may be a layer detecting inputs applied from the outside. The inputs applied from the outside may be provided in various forms. In one embodiment, for example, the external inputs may include various types of external inputs such as a part of a user's body, a stylus pen, light, heat, or pressure. In an embodiment, inputs through contact by a part of a body such as a user's hand and close or adjacent air touch (e.g., hovering) may be a form of external inputs.

According to an embodiment, a thickness T1 of the first protective layer PL1, a thickness T2 of the second protective layer PL2, and a thickness T3 of the third protective layer PL3 may each be in a range of about 10 μm to about 200 μm. In an embodiment, the thickness T1 of the first protective layer PL1, the thickness T2 of the second protective layer PL2, and the thickness T3 of the third protective layer PL3 may be the same as each other. Alternatively, one of the thickness T1 of the first protective layer PL1, the thickness T2 of the second protective layer PL2 and the thickness T3 of the third protective layer PL3 may be different from another of the thickness T1 of the first protective layer PL1, the thickness T2 of the second protective layer PL2 and the thickness T3 of the third protective layer PL3. In one embodiment, for example, the thickness T1 of the first protective layer PL1 and the thickness T2 of the second protective layer PL2 may be the same as each other, and the thickness T3 of the third protective layer PL3 may be different from the thickness T1 of the first protective layer PL1 and the thickness T2 of the second protective layer PL2. However, the embodiment of the invention is not limited thereto.

The first protective layer PL1 may have an in-plane retardation of greater than about 0 nm and not greater than about 200 nm. The second protective layer PL2 may have an in-plane retardation of greater than about 0 nm and not greater than about 200 nm. The third protective layer PL3 may have an in-plane retardation of greater than about 0 nm and not greater than about 200 nm. The first protective layer PL1 may have a thickness direction retardation of greater than about nm and not greater than about 1,500 nm. The second protective layer PL2 may have a thickness direction retardation of greater than about 0 nm and not greater than about 1,500 nm. The third protective layer PL3 may have a thickness direction retardation of greater than about 0 nm and not greater than about 1,500 nm. In an embodiment, the first protective layer PL1, the second protective layer PL2, and the third protective layer PL3 may have a total thickness direction retardation of greater than about 0 nm and not greater than about 1,500 nm. In one embodiment, for example, where the first protective layer PL1 has a thickness direction retardation of about 1000 nm, the second protective layer PL2 may a thickness direction retardation of about 500 nm or less, and the third protective layer PL3 may be omitted. In an embodiment where the plurality of protective layers PL1, PL2, and PL3 are disposed above the polarizing plate POL, the total sum of the thickness direction retardation may be about 1,500 nm or less. When four or more protective layers are disposed above the polarizing plate POL, the protective layers may have a total thickness direction retardation of about 1,500 nm or less.

According to an embodiment, the thickness direction retardation of the first protective layer PL1 and the thickness direction retardation of the second protective layer PL2 may be different from each other. The thickness direction retardation of the first protective layer PL1 and the thickness direction retardation of the third protective layer PL3 may be different from each other. However, the embodiment of the invention is not limited thereto, and alternatively, the thickness direction retardation of the first protective layer PL1 and the thickness direction retardation of the second protective layer PL2 may be the same as each other. In an embodiment, one of the thickness direction retardation of the first protective layer PL1, the thickness direction retardation of the second protective layer PL2 and the thickness direction retardation of the third protective layer PL3 may be different from another of the thickness direction retardation of the first protective layer PL1, the thickness direction retardation of the second protective layer PL2 and the thickness direction retardation of the third protective layer PL3.

In an embodiment, referring to FIG. 4, an adhesive layer AL may be disposed between the polarizing plate POL and the protective layer PL. Referring to FIG. 5, in an embodiment, adhesive layers AL1, AL2, and AL3 may be disposed between the polarizing plate POL and the third protective layer PL3, between the third protective layer PL3 and the first protective layer PL1, and between the first protective layer PL1 and the second protective layer PL2, respectively. Alternatively, at least one of the adhesive layers AL1, AL2, or AL3 may be omitted.

The adhesive layers AL, AL1, AL2, and AL3 may each be optically transparent. In one embodiment, for example, the adhesive layers AL, AL1, AL2, and AL3 may each include a pressure sensitive adhesive ("PSA") or an optically clear adhesive. However, the embodiment of the invention is not limited thereto.

Figure 6:
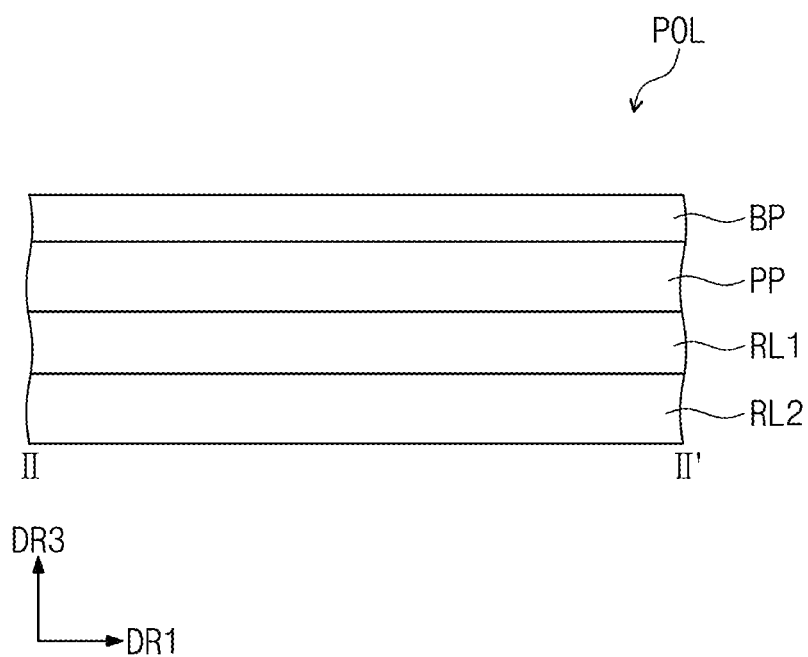
FIG. 6 is a cross-sectional view of a polarizing plate according to an embodiment.

FIG. 6 is a cross-sectional view showing a polarizing plate POL according to an embodiment.

An embodiment of the polarizing plate POL may include a linear polarization layer PP and at least one phase retardation layer RL1 or RL2. The linear polarization layer PP may be an optical layer that linearly polarizes the provided light in one direction. The linear polarization layer PP may be prepared by adsorbing a dichroic dye onto a stretched polymer film. In one embodiment, for example, the linear polarization layer PP may be prepared by adsorbing iodine onto a stretched polyvinyl alcohol film. In such an embodiment, a direction in which the polymer film is stretched may be an absorption axis of the linear polarization layer PP, and a direction perpendicular to the stretched direction may be a transmission axis of the linear polarization layer PP.

Referring to FIG. 6, an embodiment of the polarizing plate POL may include a first phase retardation layer RL1 and a second phase retardation layer RL2 disposed below the linear polarization layer PP. The second phase retardation layer RL2 may be disposed below the first phase retardation layer RL1. The linear polarization layer PP may be closer to the first phase retardation layer RL1 rather than the second phase retardation layer RL2.

The first phase retardation layer RL1 and the second phase retardation layer RL2 may be an optical layer for delaying or retarding the phase of the light passing therethrough. The first phase retardation layer RL1 may be a λ/2 phase retardation layer, e.g., a half-wave plate layer, and the second phase retardation layer RL2 may be a λ/4 phase retardation layer, e.g., a quarter-wave plate layer.

The first phase retardation layer RL1 may be an optical layer for delaying the phase of the provided light by 2π. In one embodiment, For example, when light transmitted through the linear polarization layer PP and provided to the first phase retardation layer RL1 has a wavelength of about 550 nm, the light passing through the first phase retardation layer RL1 may have a retardation value of about 275 nm. In an embodiment, the first phase retardation layer RL1 may change a polarization state of incident light. The polarization direction of light incident from the linear polarization layer PP to the first phase retardation layer RL1 may change. The light incident from the linear polarization layer PP to the first phase retardation layer RL1 may be linearly polarized.

The second phase retardation layer RL2 has optical anisotropy and may change the polarization state of light incident on the second phase retardation layer RL2. That is, the light transmitted through the linear polarization layer PP and provided to the second phase retardation layer RL2 may be changed from a linearly polarized state to a circularly polarized state. In such an embodiment, light provided to the second phase retardation layer RL2 in a circularly polarized state may be changed to a linearly polarized state. In one embodiment, for example, when light transmitted through the linear polarization layer PP and provided to the second phase retardation layer RL2 has a wavelength of about 550 nm, the light passing through the second phase retardation layer RL2 may have a retardation value of about 137.5 nm.

Figure 7:
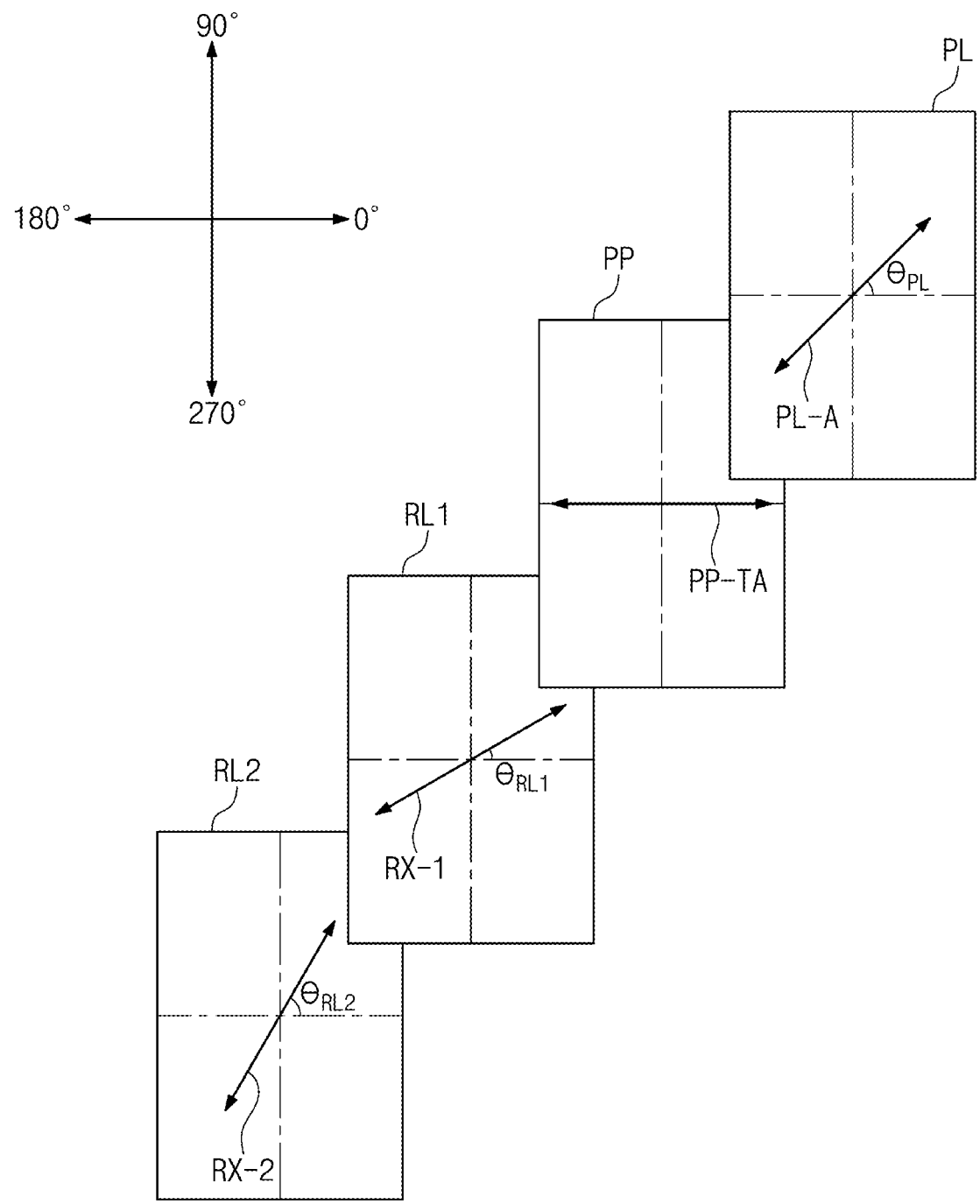
FIG. 7 is an image showing a relationship between optical axes in a display device according to an embodiment.

Referring to FIG. 7, an angle $\theta_{RL1}$ between a transmission axis PP-TA of the linear polarization layer PP and an optical axis RX-1 (hereinafter, a second optical axis) of the first phase retardation layer RL1 may be about 15±5°, and an angle $\theta_{RL2}$ between the transmission axis PP-TA of the linear polarization layer PP and an optical axis RX-2 (hereinafter, a third optical axis) of the second phase retardation layer RL2 may be about 75±5°.

In an embodiment of the polarizing plate POL, the first phase retardation layer RL1 and the second phase retardation layer RL2 may each be a liquid crystal coating layer. The first phase retardation layer RL1 and the second phase retardation layer RL2 may be liquid crystal coating layers formed using reactive liquid crystal monomers. The first phase retardation layer RL1 and the second phase retardation layer RL2 may be prepared through a process of coating, aligning, and polymerizing reactive liquid crystal monomers.

In an embodiment, the polarizing plate POL (FIG. 6) may further include a base film BP disposed above the linear polarization layer PP. The elongation in one direction of the base film BP may be higher than the elongation in the other direction.

In an embodiment of the polarizing plate POL, an angle $\theta_{BP}$ (FIG. 8) between the transmission axis PP-TA of the linear polarization layer PP and an optical axis BP-A (hereinafter, a fourth optical axis) of the base film BP may be about 45±5°. The fourth optical axis BP-A of the base film BP corresponds to a direction having a high elongation.

The base film BP may be a stretched acrylic film, a stretched cycloolefin film, or a stretched polyethylene terephthalate film. However, the embodiment of the invention is not limited thereto.

Figure 8:
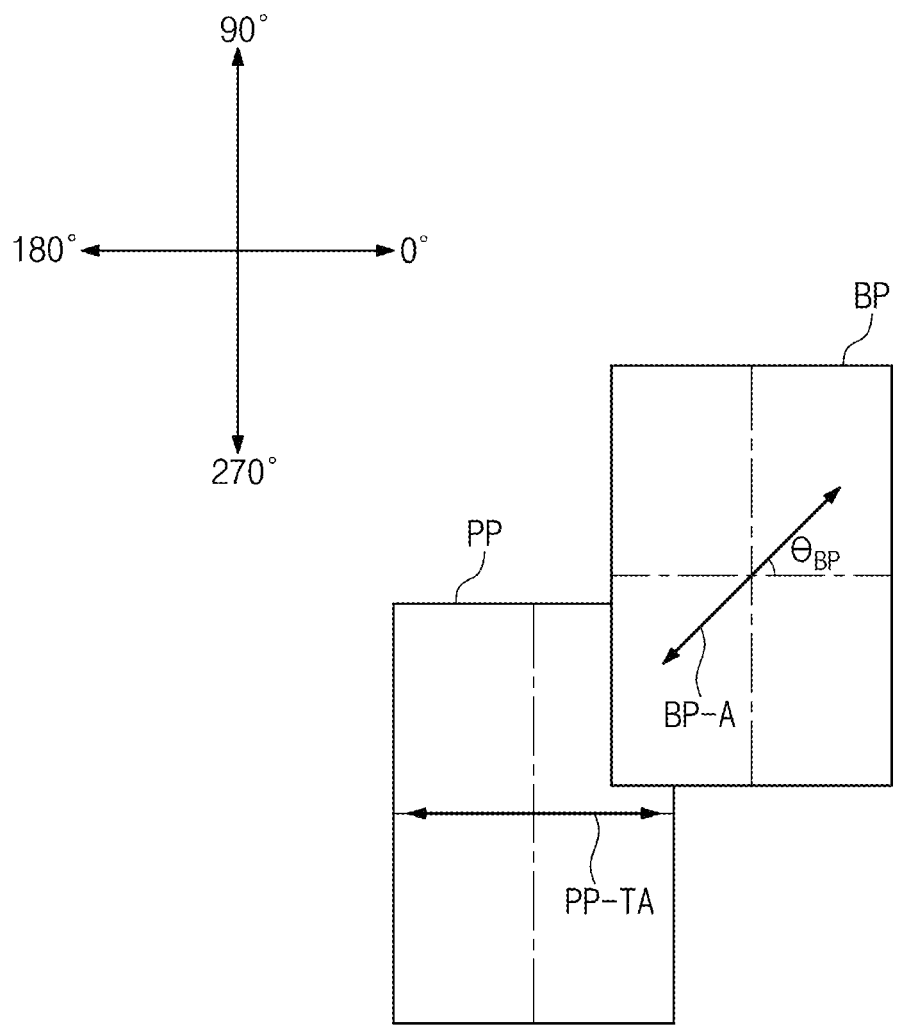
FIG. 8 is an image showing a relationship between optical axes in a display device according to an embodiment.

FIGS. 7 and 8 schematically illustrate an optical axis relationship between functional layers in a display device according to an embodiment. When a direction of the transmission axis PP-TA of the linear polarization layer PP is 0° and 180°, an angle $\theta_{PL}$ between the first optical axis PL-A of the protective layer PL disposed above the linear polarization layer PP and the transmission axis PP-TA of the linear polarization layer PP may be about 45±5°. In an embodiment, an angle $\theta_{RM}$ between the second optical axis RX-1 of the first phase retardation layer RL1 and the transmission axis PP-TA of the linear polarization layer PP may be about 15±5°, and an angle $\theta_{RL2}$ between the third optical axis RX-2 of the second phase retardation layer RL2 and the transmission axis PP-TA of the linear polarization layer PP may be about 75±5°. An angle $\theta_{BP}$ between the transmission axis PP-TA of the linear polarization layer PP and the fourth optical axis BP-A of the base film BP may be about 45±5°.

In an embodiment, the transmission axis PP-TA of the linear polarization layer PP, the first optical axis PL-A of the protective layer PL, the second optical axis RX-1 of the first phase retardation layer RL1, the third optical axis RX-2 of the second phase retardation layer RL2, and the fourth optical axis BP-A of the base film BP, which are shown in FIGS. 7 and 8, represent a relative arrangement relationship of the optical axes, but the directions of each of the optical axes are not limited to those shown in FIGS. 7 and 8. In one embodiment, for example, the transmission axis PP-TA of the linear polarization layer PP may be parallel to the first directional axis DR1, or parallel to the second directional axis DR2 when viewed from the upper surface FS of the display device DD (FIG. 2). In such an embodiment, the transmission axis PP-TA of the linear polarization layer PP may be in the direction of about 0° or about 90°. However, the embodiment of the invention is not limited thereto, and alternatively, the transmission axis PP-TA of the linear polarization layer PP may be in the direction of about 45°. Even when the transmission axis PP-TA of the linear polarization layer PP is in the direction of about 45°, angles formed between the transmission axis PP-TA of the linear polarization layer PP and the optical axes of the protective layer PL, the first phase retardation layer RL1, and the second phase retardation layer RL2 may be defined as described above.

Table 1 below shows in-plane retardation and thickness retardation of each of Comparative Examples and Examples. Table 2 evaluates photographing quality of a display device including protective layers of Comparative Examples and Examples. Subjects were photographed using a camera module included in the display device to evaluate whether or not chromatic dispersion and color unevenness were viewed or observed. The subjects and the camera module faced each other while photographing with the front surface of the display device therebetween. The subjects were a cold cathode fluorescent lamp ("CCFL") light source monitor and an LCD light source monitor. In Table 2, "NG" indicates that the chromatic dispersion or the color unevenness is viewed or observed, and "OK" indicates that the chromatic dispersion or the color unevenness is not viewed or observed.

TABLE 1

| Item | In-plane retardation ($R_e$, nm) | Thickness retardation ($R_{th}$, nm) |
|---|---|---|
| Comparative 1 | 50 | 5446 |
| Comparative 2 | 5200 | 6000 |

TABLE 1-continued

| Item | In-plane retardation (R_e, nm) | Thickness retardation (R_th, nm) |
|---|---|---|
| Comparative 3 | 131 | 3729 |
| Comparative 4 | 415 | 1176 |
| Comparative 5 | 2 | 1742 |
| Example 1 | 2 | 8 |
| Example 2 | 10 | 65 |
| Example 3 | 22 | 977 |

TABLE 2

| Item | Chromatic dispersion | Color unevenness |
|---|---|---|
| Comparative 1 | OK | NG |
| Comparative 2 | NG | NG |
| Comparative 3 | OK | NG |
| Comparative 4 | NG | OK |
| Comparative 5 | OK | NG |
| Example 1 | OK | OK |
| Example 2 | OK | OK |
| Example 3 | OK | OK |

Referring to Table 2, it is seen that the chromatic dispersion was viewed in Comparative Examples 2 and 4. Comparative Examples 2 and 4 had an in-plane retardation of greater than 200 nm, indicating that a difference in transmittance for each wavelength according to the in-plane retardation is significant. Due to the difference in transmittance for each wavelength according to the in-plane retardation, it is determined that the chromatic dispersion was viewed in the display devices of Comparative Examples 2 and 4.

Referring to Table 2, it is seen that the color unevenness was viewed in Comparative Examples 1 to 3 and 5. Comparative Examples 1 to 3 and 5 had a thickness retardation of greater than 1,000 nm, and a difference in optical paths was caused due to the thickness retardation. Due to the difference in optical paths, it is determined that the color unevenness was viewed in Comparative Examples 1 to 3 and 5.

Unlike Comparative Examples 1 to 5, it is seen that in the protective layers of Examples 1 to 3, the chromatic dispersion and the color unevenness were not viewed. The protective layers of Examples 1 to 3 each had an in-plane retardation of greater than 0 nm to 200 nm, and a thickness retardation of greater than 0 nm to 1,000 nm according to an embodiment of the invention. Accordingly, in an embodiment of the display devices including the protective layer corresponding to Examples 1 to 3, interference of light due to the in-plane retardation and the thickness retardation is effectively prevented, thereby enhancing the quality of captured images.

An embodiment of the display device may include a display panel, a camera module disposed below the display panel, a polarizing layer disposed above the display panel, and a protective layer disposed above the polarizing layer. In such an embodiment, the thickness direction retardation of the protective layer may be greater than about 0 nm and not greater than about 1,500 nm, and the in-plane retardation perpendicular to the thickness direction may be greater than about 0 nm and not greater than about 200 nm. In such an embodiment, the protective layer may have optimized in-plane retardation and thickness retardation. In such an embodiment of the display device including the protective layer, the quality of images captured using the camera module may be enhanced.

In such an embodiment, a display device optimizes the thickness direction retardation and in-plane retardation of a protective layer disposed above a polarizing plate, and may thus exhibit enhanced quality of images captured using a camera module.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display panel;
a polarizing plate disposed above the display panel, wherein the polarizing plate comprises a linear polarization layer, a first phase retardation layer and a second phase retardation layer;
a support member disposed below the display panel, wherein a through hole is defined in the support member;
an electronic module disposed below the display panel, wherein the electronic module overlaps the through hole; and
at least one protective layer disposed above the linear polarization layer, the first phase retardation layer and the second phase retardation layer of the polarizing plate,
wherein an outermost surface of the display device is defined by an upper surface of the protective layer, and
wherein the at least one protective layer disposed above the polarizing plate and defining the outermost surface of the display device has a thickness direction retardation of greater than about 0 nm and not greater than about 1,500 nm.

2. The display device of claim 1, wherein the at least one protective layer has an in-plane retardation perpendicular to the thickness direction of about greater than about 0 nm and not greater than about 200 nm.

3. The display device of claim 1, wherein the at least one protective layer has a thickness in a range of about 10 μm to about 200 μm.

4. The display device of claim 1, wherein the at least one protective layer has a transmittance of about 85% or greater for light in a wavelength band of about 400 nm to about 800 nm.

5. The display device of claim 1, wherein the at least one protective layer comprises at least one selected from polyimide, polycarbonate,
cycloolefin polymer, triacetyl cellulose, polyethylene terephthalate, and polymethyl methacrylate.

6. The display device of claim 1, wherein
the at least one protective layer comprises a first protective layer adjacent to the polarizing plate and a second protective layer disposed on the first protective layer,
the first protective layer comprises glass or a polymer resin, and
the second protective layer comprises a polymer resin.

7. The display device of claim 6, wherein a thickness direction retardation of the first protective layer and a thickness direction retardation of the second protective layer are different from each other.

8. The display device of claim 6, wherein
the first protective layer comprises glass, and
the second protective layer comprises a polymer resin.

9. The display device of claim 6, wherein
the at least one protective layer further comprises a third protective layer disposed between the polarizing plate and the first protective layer, wherein the third protective layer comprises a conductive material.

10. The display device of claim 1, wherein the electronic module is at least partially inserted into the through hole.

11. The display device of claim 1, further comprising:
an adhesive layer disposed between the polarizing plate and the at least one protective layer.

12. The display device of claim 1, wherein:
the display panel includes an active area and a peripheral area adjacent to the active area; and
the through hole overlaps the active area and is defined to be spaced apart from the peripheral area on a plane.

13. A display device comprising:
an electronic module;
a display panel disposed above the electronic module and including a first display area and a second display area adjacent to the first display area, where the electronic module overlaps the second display area;
a polarizing plate disposed above the display panel, wherein the polarizing plate comprises a linear polarization layer, a first phase retardation layer and a second phase retardation layer; and
at least one protective layer disposed above the linear polarization layer, the first phase retardation layer and the second phase retardation layer of the polarizing plate,
wherein the at least one protective layer has a thickness direction retardation of greater than about 0 nm and not greater than about 1,500 nm and an in-plane retardation perpendicular to the thickness direction of greater than about 0 nm and not greater than about 200 nm, and
wherein an outermost surface of the display device is defined by an upper surface of the protective layer.

14. The display device of claim 13, wherein the second display area has a lower pixel density or a lower wiring density than the first display area.

15. The display device of claim 13, wherein
the at least one protective layer comprises a first protective layer adjacent to the polarizing plate and a second protective layer disposed on the first protective layer,
the first protective layer comprises glass or a polymer resin, and
the second protective layer comprises a polymer resin.

16. The display device of claim 15, wherein a thickness direction retardation of the first protective layer and a thickness direction retardation of the second protective layer are different from each other.

17. The display device of claim 13, wherein the at least one protective layer has a thickness in a range of about 10 μm to about 200 μm.

18. The display device of claim 13, wherein an angle formed between a transmission axis of the linear polarization layer and a first optical axis of the at least one protective layer is about 45±5°.

19. The display device of claim 13, wherein
the first phase retardation layer and the second phase retardation layer are a λ/2 phase retardation layer and a λ/4 phase retardation layer, and
the linear polarization layer is closer to the λ/2 phase retardation layer than the λ/4 phase retardation layer.

20. The display device of claim 19, wherein:
an angle between a transmission axis of the linear polarization layer and a second optical axis of the λ/2 phase retardation layer is about 15±5°; and
an angle between a transmission axis of the linear polarization layer a third optical axis of the λ/4 phase retardation layer is about 75±5°.

21. The display device of claim 13, wherein:
the polarizing plate further comprises a base film disposed above the linear polarization layer; and
an angle between a transmission axis of the linear polarization layer and a fourth optical axis of the base film is about 45±5°.

* * * * *